United States Patent
Lee

(10) Patent No.: US 8,102,151 B2
(45) Date of Patent: Jan. 24, 2012

(54) TERMINAL HAVING REAL TIME CLOCK (RTC) OPERATOR AND METHOD OF RTC OPERATION USING THE SAME

(75) Inventor: Ju Hwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 595 days.

(21) Appl. No.: 12/257,927

(22) Filed: Oct. 24, 2008

(65) Prior Publication Data

US 2009/0113222 A1   Apr. 30, 2009

(30) Foreign Application Priority Data

Oct. 31, 2007   (KR) .................. 10-2007-0109996

(51) Int. Cl.
*H02J 7/00* (2006.01)
*G06F 1/26* (2006.01)
*G06F 1/00* (2006.01)

(52) U.S. Cl. ............... 320/133; 713/320; 713/322

(58) Field of Classification Search ............ 320/133
See application file for complete search history.

(56) References Cited

U.S. PATENT DOCUMENTS

| | | | |
|---|---|---|---|
| 5,631,814 A * | 5/1997 | Zak | 363/37 |
| 5,758,172 A * | 5/1998 | Seo | 713/300 |
| 5,781,013 A * | 7/1998 | Takahashi | 324/426 |
| 5,781,780 A * | 7/1998 | Walsh et al. | 713/300 |
| 2003/0128157 A1 * | 7/2003 | Salkhi | 342/357.06 |
| 2004/0036449 A1 * | 2/2004 | Bean et al. | 320/166 |
| 2006/0005059 A1 * | 1/2006 | Uzelac et al. | 713/323 |

* cited by examiner

*Primary Examiner* — M'Baye Diao
(74) *Attorney, Agent, or Firm* — Jefferson IP Law, LLP

(57) ABSTRACT

A method of operating a Real Time Clock (RTC) in a terminal is provided. The method includes detecting a clock signal transmitted to an RTC block when the main power supply is switched off, and supplying a power to the RTC block for its operation by charging and discharging the power periodically supplied from the backup battery according to the detected clock signal. A DC/DC converter connected to a backup battery is periodically switched on and off, and a capacitor is charged and discharged using the power of the backup battery, thereby avoiding supplying power from a backup battery continuously to an RTC block. Therefore, power consumption is reduced and a duration of time for maintaining RTC data is extended.

14 Claims, 3 Drawing Sheets

# TERMINAL HAVING REAL TIME CLOCK (RTC) OPERATOR AND METHOD OF RTC OPERATION USING THE SAME

PRIORITY

This application claims the benefit under 35 U.S.C. §119 (a) of a Korean patent application filed in the Korean Intellectual Property Office on Oct. 31, 2007 and assigned Serial No. 2007-0109996, the entire disclosure of which is hereby incorporated by reference.

BACKGROUND OF THE INVENTION

1. Field of the Invention

The present invention relates to a terminal having a Real Time Clock (hereafter, RTC) operator and a method of RTC operation using the same. More particularly, the present invention relates to a terminal having an RTC operator, enabling a reduction of power consumption from a backup battery by periodically switching on/off a DC/DC converter, and charging/discharging a capacitor with the power from the backup battery when the power supplied from a main power source is switched off, and a method of RTC operation using the same.

2. Description of the Related Art

Unlike a synchronous Code Division Multiple Access (CDMA) terminal, in an asynchronous mobile communication system, such as a Global System for Communications (GSM) terminal and a General Packet Radio Service (GPRS) terminal, a user must input a time so that an internal clock of the terminal operates correctly.

In the case of a synchronous terminal, the time of an internal clock of the terminal is automatically set during a setting operation using time information received from a network system, and thereby the internal clock always maintains a correct time without requiring a user's input.

However, in the case of an asynchronous terminal, a network system does not send time information to the terminal, and therefore a user of the terminal must input a time. Therefore, each terminal may have a different time setting, and the user may be inconvenienced by having to input the time whenever the terminal is switched on.

In order to solve this problem, the asynchronous terminal uses a backup battery to protect the time information from being erased when the power from a main power source is discontinued. The asynchronous terminal has an internal RTC to manage and display the time information.

However, for the operation of the RTC, the backup battery supplies power to the RTC continuously, which may result in discontinuation of RTC operation when the backup battery is completely discharged. At this moment, the RTC is reset to an initial time setting (generally, "0"), and thereby display of the correct time is not possible.

SUMMARY OF THE INVENTION

An aspect of the present invention is to address at least the above-mentioned problems, and/or disadvantages and to provide at least the advantages described below. Accordingly, an aspect of the present invention is to provide a terminal having an RTC operator that reduces consumption of a backup battery power, and a method of RTC operation using the same.

Another aspect of the present invention is to provide a terminal having an RTC operator that charges and discharges a capacitor to supply an operating power to an RTC block by periodically switching on/off a DC/DC converter connected to a backup battery, and a method of RTC operation using the same.

In accordance with an aspect of the present invention, a method of operating an RTC in a terminal having an RTC block, a main power supply and a backup battery is provided. The method includes activating the backup battery when the main power supply is switched off, and detecting a clock signal transmitted to the RTC block, supplying and discontinuing a supply of power from the backup battery according to the detected clock signal, and supplying an operating power to the RTC block for its operation by charging and discharging a capacitor with the power of the backup battery.

In accordance with another aspect of the present invention, a terminal having an RTC block, a main power supply and a backup battery is provided. The terminal includes a control unit for generating a power-off signal when the main power supply is switched off, a switch for generating an activation signal of the backup battery by a switching function according to the power-off signal, a detector for detecting a clock signal generated by an activation of the backup battery, a DC/DC converter connected to the backup battery for periodically switching on and off according to the switching function and the detected clock signal, a capacitor for generating an operating power by charging and discharging using a power of the backup battery according to periodic switching on and off of the DC/DC converter, and an RTC block for generating time information using the operating power.

In accordance with still another aspect of the present invention, a DC/DC converter connected to a backup battery is periodically switched on and off, and a capacitor is charged and discharged with the power of the backup battery, thereby avoiding supplying a power of the backup battery continuously to an RTC block. Therefore, power consumption is reduced and a duration of time for maintaining RTC data is extended.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Although a Global System for Communications (GSM) terminal is illustrated as an example in the description of the present invention, the present invention is not limited thereto. That is, the terminal according to exemplary embodiments of the present invention may be any terminal, such as a General Packet Radio Service (GPRS) terminal, a Universal Mobile Telecommunications System (UMTS) terminal, a Wideband Code Division Multiple Access (WCDMA) terminal and the like.

Figure 1:
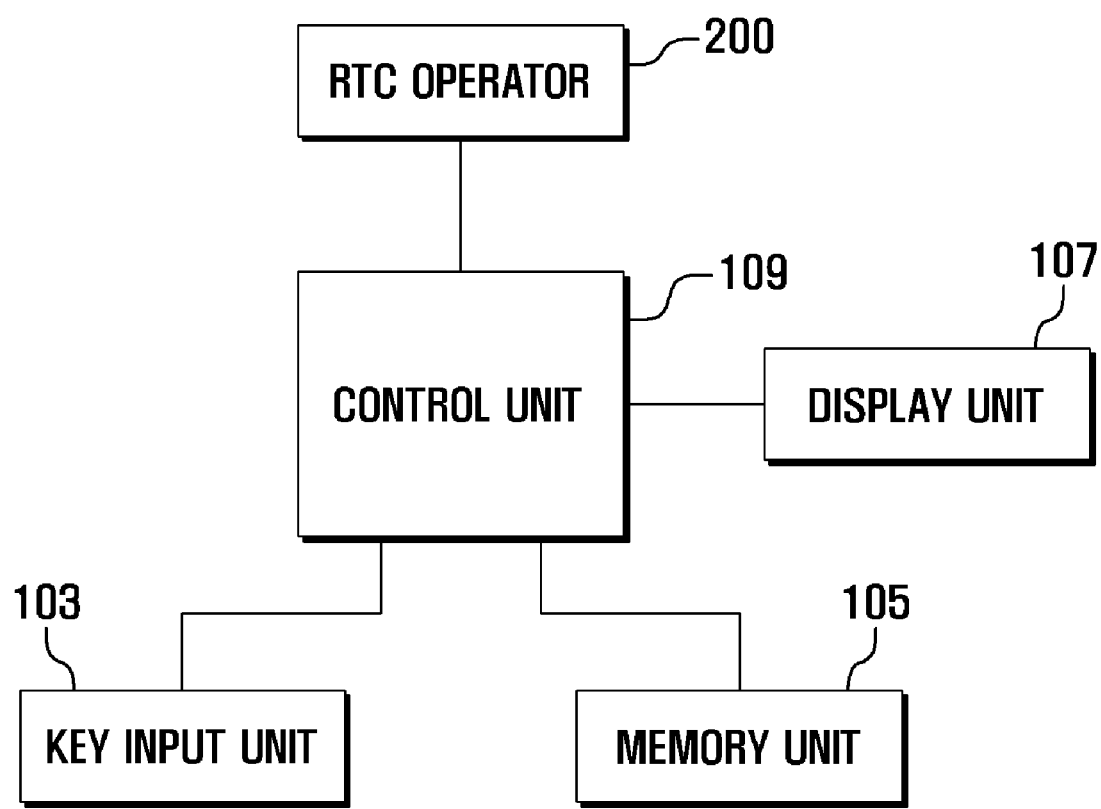
FIG. 1 is a block diagram illustrating a configuration of a terminal having an RTC operator according to an exemplary embodiment of the present invention.

FIG. 1 is a block diagram illustrating a configuration of a terminal having an RTC operator according to an exemplary embodiment of the present invention.

Referring to FIG. 1, the terminal includes a key input unit 103, a memory unit 105, a display unit 107, a control unit 109, and a Real Time Clock (RTC) operator 200.

The key input unit 103 receives a key input for controlling the operation of the terminal. The key input unit 103 may be used for an operation such as a time setting when the main power of the terminal is switched on after having been switched off and RTC information is reset due to a complete discharge of a backup battery 201 (shown in FIG. 2). While the supply of power and discontinuation of the supply power are described herein as being switch on and switched off, respectively, the present invention is not limited thereto. Exemplary embodiments of the present invention are equally applicable to any manner in which power is supplied or discontinued.

The memory unit 105 stores programs and information required for the operation of the terminal, and stores time setting information input by a user. The time setting information is deleted when the main power is switched off.

The display unit 107 displays an operational state and information related to the operation of the terminal. The display unit 107 displays the time setting information, and a screen for requesting time setting when the RTC information is reset.

The display unit 107 may be provided as a Liquid Crystal Display (LCD). In this case, the display unit 107 may include a controller for controlling the LCD, a video memory in which image data is stored and an LCD element. If the LCD is provided as a touch screen, the display unit 107 may perform a part or all of the functions of the key input unit 103.

The control unit 109 controls the general operations of individual components of the terminal. The control unit 109 controls the operational function of the RTC operator 200. The control unit 109 generates a power-off signal when the main power is switched off, and outputs the generated power-off signal to the RTC operator 200. The main power may be determined to be switched off in any one of various ways. For example, the main power may be determined to be switched off when a main power-off key is depressed, when a main power-off menu item is selected, if the main power is determined to be close to being exhausted, or if it removal of battery supplying the main power is detected. Additionally, the control unit 109 activates the RTC operator 200 when the main power is switched off. Such a function is later described in more detail referring to FIG. 2. Further, the control unit 109 deletes the RTC information upon switching off the main power and controls for a complete discharge of the backup battery 201.

The terminal may further include a Radio Frequency (RF) unit for performing wireless communications. The RF unit includes an RF transmitter that up-converts the frequency of a signal to be transmitted and amplifies the signal, and an RF receiver that low-noise amplifies a received signal and down-converts its frequency.

Hereinafter, the RTC operator of the terminal according to the present invention is described.

Figure 2:
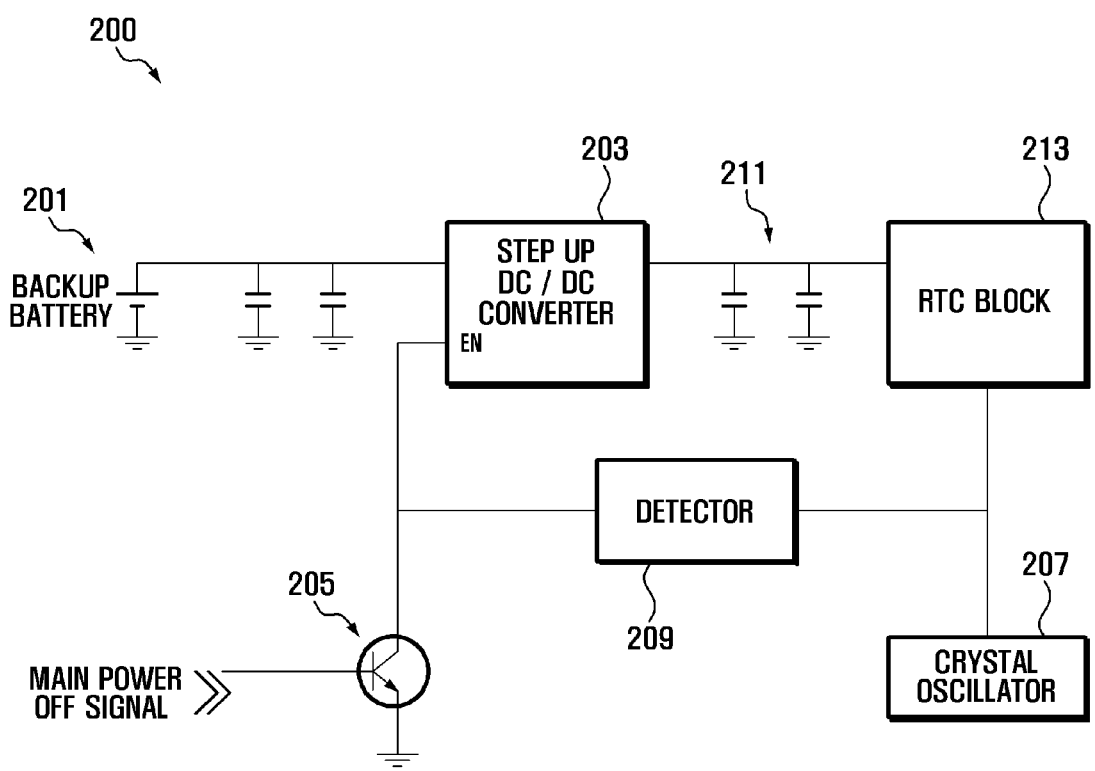
FIG. 2 is a block diagram illustrating a configuration of an RTC operator according to an exemplary embodiment of the present invention.

FIG. 2 is a block diagram illustrating a configuration of an RTC operator according to an exemplary embodiment of the present invention.

Referring to FIG. 2, the RTC operator 200 includes a backup battery 201, a DC/DC converter 203, a switch 205, a crystal oscillator 207, a detector 209, a capacitor 211, and an RTC block 213.

As described above, the control unit 109 generates a power-off signal when a main power is switched off, and outputs the power-off signal to the switch 205. Because the switch 205 is an NPN type transistor, a low signal is inputted to base of the transistor. Subsequently, the switch 205 is disconnected to the DC/DC converter 203 and the detector 209 by switching off. In the present exemplary embodiment, the switch is an NPN type transistor. However, the present invention is not limited thereto. That is, the switch may be a PNP type transistor.

The crystal oscillator 207 having a slip mode is connected to the RTC block 213, and generates a clock signal by using the power supply from the backup battery 201. Here, the clock signal may be generated with a frequency of 32.768 KHz, and may have a voltage value in the range of 0-1 V.

The detector 209, which is connected to an enable pin EN of the DC/DC converter 203, detects the clock signal generated by the crystal oscillator 207. The detector 209 may have a comparator for comparing a setting voltage with the clock signal generated by the crystal oscillator 207, and may generate a square wave signal having a specific period by using a compared value.

The DC/DC converter 203 is connected to the backup battery 201. When the main power is switched off, the DC/DC converter 203 receives power from the backup battery 201 and supplies the power to the RTC block 213. The DC/DC converter 203 is connected to the detector 209 through the enable pin EN, and performs a periodic switching on/off operation according to the signal generated by the detector 209. That is, the DC/DC converter 203 is periodically switched on/off according to the activation through the switch 205 and the signal generated by the detector 209. The power supplied from the backup battery 201 is thereby switched on and off accordingly.

The capacitor 211 is connected between the DC/DC converter 203 and the RTC block 213. The capacitor 211 is charged according to the periodical switching on/off operation of the DC/DC converter 203 and discharges when power is not supplied from the backup battery 201. That is, when the DC/DC converter 203 is switched on, the capacitor 211 transmits the power supplied from the backup battery 201 to the RTC block 213, and simultaneously is charged to a preset power level. When the DC/DC converter 203 is switched off, the supply of power from the backup battery 201 is discontinued. The capacitor 211 then supplies the charged power to the RTC block 213 for the operation of the RTC block 213. The capacitor 211 is selected by considering a time constant of charge/discharge, such that the power supplied to RTC block 213 maintains substantially constant.

The RTC block 213 generates time information (hour, minute, and second) by counting the clock signal generated by the crystal oscillator 207. The RTC block 213 maintains RTC information, namely time setting information, by using the power supplied through the charge/discharge of the capacitor 211.

In the present exemplary embodiment referring to FIG. 2, the RTC operator does not include a switch for switching on/off of backup battery. However, the present invention is not limited thereto. That is, the RTC operator may also include a switch for switching on/off of backup battery for example, backup battery is switched off when main power is switched on and backup battery is switched on when main power is switched off.

Hereinafter, a method of RTC operation in a terminal having an RTC operator according to an exemplary embodiment of the present invention is described referring to FIGS. 1 to 3.

Figure 3:
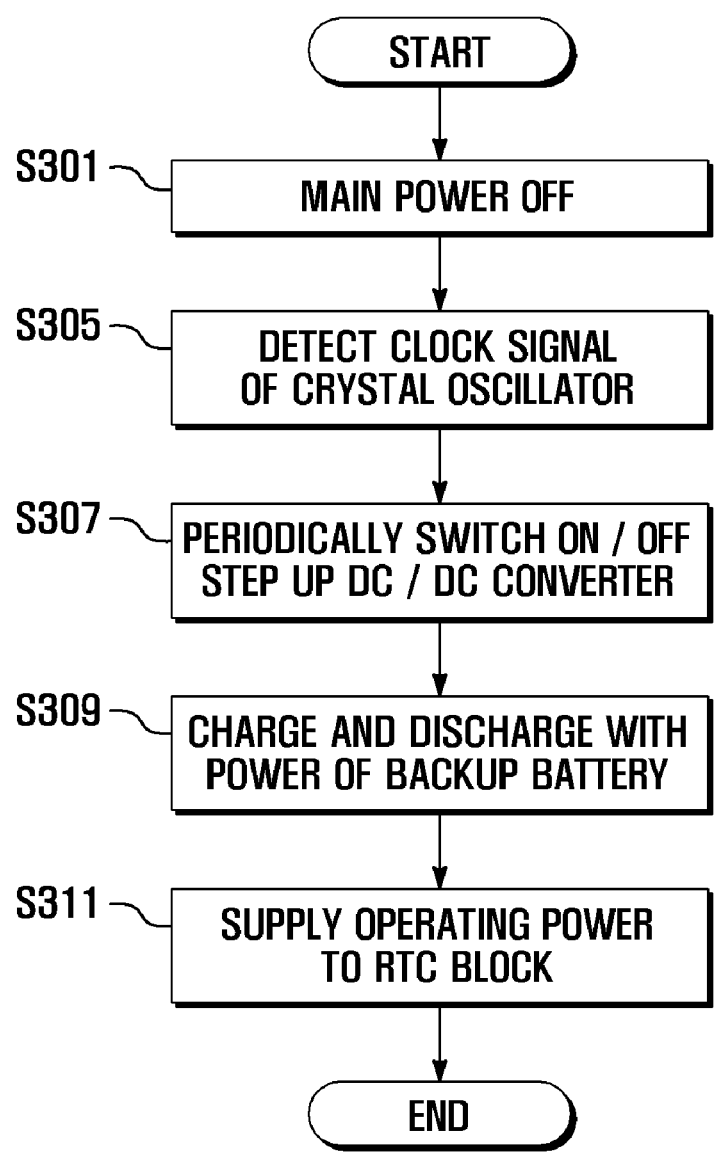
FIG. 3 is a flowchart showing a method of RTC operation in a terminal having an RTC operator according to an exemplary embodiment of the present invention.

FIG. 3 is a flowchart illustrating a method of RTC operation in a terminal having an RTC operator according to an exemplary embodiment of the present invention.

Referring to FIG. 3, the control unit 109 first detects that a main power is switched off in step S301. A user of the terminal may switch off the power when not using the terminal or when battery replacement is necessary. In addition, the main battery may switch off due to a complete discharge of the battery.

The detector 209 detects a clock signal generated by the crystal oscillator 207 in step S305. The crystal oscillator 207 operating by the power supply from the backup battery 201 generates the clock signal to be transferred to the RTC block 213. The detector 209 connected to the crystal oscillator 207 generates a square wave signal having a preset period by comparing a setting voltage with the clock signal of the crystal oscillator 207.

The DC/DC converter 203 is periodically switched on and off in step S307. That is, the enable pin EN of the DC/DC converter 203 is connected to the detector 209, and the DC/DC converter 203 is periodically switched on and off according to the square wave signal having a preset period generated by the detector 209 in step S305.

The capacitor 211 is charged or discharged according to the power supplied from the backup battery 201 in step S309. As the DC/DC converter 203 is periodically switched on and off in step S307, the power supplied from the backup battery 201 to the DC/DC converter 203 is thereby periodically discontinued. At this time, the power supply from the DC/DC converter 203 to the RTC block 213 is interrupted by switching off the power. In order not to interrupt the supply of power required by the RTC block 213, the capacitor 211 is installed between the DC/DC converter 203 and the RTC block 213 to charge and discharge according to the power supplied from the backup battery 201. While the DC/DC converter 203 is switched on, the DC/DC converter 203 converts the power supplied from the backup battery 201 into a power having a constant direct current and supplies the power to the capacitor 211.

Lastly, the power charged in the capacitor 211 in step S309 is supplied to the RTC block 213 in step S311. That is, when the DC/DC converter 203 is switched on, the capacitor 211 transmits the power supplied from backup battery 201 to the RTC block 213 and is simultaneously charged by the power of the backup battery. When the DC/DC converter 203 is switched off, the capacitor 211 supplies the charged power to the RTC block 213 while the supply of power from the backup battery 201 is discontinued.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims their equivalents.

What is claimed is:

1. A method of operating a Real Time Clock (RTC) in a terminal having an RTC block, a main power supply and a backup battery, the method comprising:
   detecting a clock signal transmitted to the RTC block when the main power supply is switched off; and
   supplying a power to the RTC block for its operation by charging and discharging a power storage unit with the power periodically supplied from the backup battery according to the detected clock signal,
   wherein the power storage unit provides power directly to the RTC block.

2. The method of claim 1, further comprising generating a square wave signal having a specific period by comparing a setting voltage with the detected clock signal.

3. The method of claim 2, wherein the period of the supply of power from the backup battery corresponds to the generated square wave signal.

4. The method of claim 1, wherein the supplying of an operating power to the RTC block comprises converting the power of the backup battery to a power having a constant direct current.

5. The method of claim 1, further comprising:
   generating time information using the clock signal; and
   maintaining the time information using the power supplied through the power storage unit.

6. The method of claim 5, wherein the clock signal is generated by a crystal oscillator.

7. The method of claim 5, wherein the time information comprises at least one of RTC information and time setting information.

8. A terminal having a Real Time Clock (RTC) block, a main power supply and a backup battery, the terminal comprising:
   a control unit for generating a power-off signal when the main power supply is switched off;
   a switch for cutting off the main power according to the power-off signal;
   a detector for detecting a clock signal;
   a DC/DC converter connected to the backup battery and periodically switching on and off according to the detected clock signal;
   a capacitor for generating an operating power by charging and discharging using a power from the backup battery according to the periodic switching on and off of the DC/DC converter; and
   an RTC block for generating time information using the operating power.

9. The terminal of claim 8, wherein the detector generates a square wave signal having a preset period by comparing a setting voltage with the clock signal transmitted to the RTC block.

10. The terminal of claim 9, wherein the detector is connected to an enable pin of the DC/DC converter, and the DC/DC converter is periodically switched on and off according to the square wave signal generated by the detector.

11. The terminal of claim 8, wherein the DC/DC converter converts the operating power from the backup battery into a power having a constant direct current.

12. The terminal of claim 8, wherein the RTC block generates time information using a clock signal generated by a crystal oscillator.

13. The terminal of claim 12, wherein the RTC block maintains the time information by using the power supplied through the charging and discharging of the capacitor.

14. The terminal of claim 13, wherein the time information comprises at least one of RTC information and time setting information.

* * * * *